US012657257B2

(12) United States Patent
Cheng et al.

(10) Patent No.: US 12,657,257 B2
(45) Date of Patent: Jun. 16, 2026

(54) CONTRASTIVE TIME SERIES REPRESENTATION LEARNING VIA META-LEARNING

(71) Applicant: NEC Laboratories America, Inc., Princeton, NJ (US)

(72) Inventors: Wei Cheng, Princeton Junction, NJ (US); Haifeng Chen, West Windsor, NJ (US); Jingchao Ni, Princeton, NJ (US); Wenchao Yu, Plainsboro, NJ (US); Yuncong Chen, Plainsboro, NJ (US); Dongsheng Luo, State College, PA (US)

(73) Assignee: NEC Corporation, Tokyo (JP)

( * ) Notice: Subject to any disclaimer, the term of this patent is extended or adjusted under 35 U.S.C. 154(b) by 965 days.

(21) Appl. No.: 17/896,590

(22) Filed: Aug. 26, 2022

(65) Prior Publication Data

US 2023/0070443 A1     Mar. 9, 2023

Related U.S. Application Data

(60) Provisional application No. 63/246,843, filed on Sep. 22, 2021, provisional application No. 63/237,544, filed on Aug. 27, 2021.

(51) Int. Cl.
*G06F 18/214* (2023.01)
*G06F 18/24* (2023.01)

(52) U.S. Cl.
CPC ............ *G06F 18/214* (2023.01); *G06F 18/24* (2023.01)

(58) Field of Classification Search
CPC ...... G06F 18/241; G06F 18/24; G06N 3/0985
See application file for complete search history.

(56) References Cited

U.S. PATENT DOCUMENTS

| | | | | |
|---|---|---|---|---|
| 2017/0206464 A1* | 7/2017 | Clayton | ............... | G06N 3/0475 |
| 2022/0366240 A1* | 11/2022 | Hwang | ............... | G06N 3/0985 |

OTHER PUBLICATIONS

Wu, Hanwei, Ather Gattami, and Markus Flierl. "Conditional mutual information-based contrastive loss for financial time series forecasting." Proceedings of the First ACM International Conference on AI in Finance. 2020. (Year: 2020).*
Luo, Dongsheng, et al. "Information-aware time series meta-contrastive learning." (2022). (Year: 2022).*

(Continued)

*Primary Examiner* — Andrew T Chiusano
(74) *Attorney, Agent, or Firm* — Vicent Duffy

(57) ABSTRACT

A computer-implemented method for meta-learning is provided. The method includes receiving a training time series and labels corresponding to some of the training time series. The method further includes optimizing time series augmentations of the training time series using a time series augmentation selection process performed by a meta learner to obtain a selected augmentation from a plurality of candidate augmentations. The method also includes training a time series encoder with contrastive loss using the selected augmentation to obtain a learned time series encoder. The method additionally includes learning, by the learned time series encoder, a vector representation of another time series. The method further includes performing, by the learned time series encoder, a downstream task of label classification for at least a portion of the other time series.

20 Claims, 10 Drawing Sheets

(56) References Cited

OTHER PUBLICATIONS

Belghazi, Mohamed Ishmael, et al. "Mutual information neural estimation." International conference on machine learning. PMLR, 2018. (Year: 2018).*

Bai et al., "An Empirical Evaluation of Generic Convolutional and Recurrent Networks for Sequence Modeling", arXiv:1803.01271v2 [cs.LG] Apr. 19, 2018, pp. 1-14.

Bredin, "Tristounet: Triplet Loss for Speaker Turn Embedding", arXiv:1609.04301v3 [cs.SD] Apr. 11, 2017, pp. 1-5.

Cao et al., "Spectral Temporal Graph Neural Network for Multi-variate Time-series Forecasting", arXiv:2103.07719v1 [cs.LG] Mar. 13, 2021, pp. 1-20.

Chen et al., "A Simple Framework for Contrastive Learning of Visual Representations", arXiv:2002.05709v3 [cs.LG] Jul. 1, 2020, pp. 1-20.

Cheng et al., "CLUB: A Contrastive Log-ratio Upper Bound of Mutual Information", arXiv:2006.12013v6 [cs.LG] Jul. 23, 2020, pp. 1-14.

Cubuk et al., "AutoAugment: Learning Augmentation Strategies from Data" in Proceedings of the IEEE/CVF Conference on Computer Vision and Pattern Recognition 2019, Jun. 2019, pp. 113-123.

Dau et al., "The UCR Time Series Archive", arXiv:1810.07758v2 [cs.LG] Sep. 9, 2019, pp. 1-12.

Eldele et al., "Time-Series Representation Learning via Temporal and Contextual Contrasting", arXiv:2106.14112v1 [cs.LG] Jun. 26, 2021, pp. 1-8.

Fan et al., "Self-Supervised Time Series Representation Learning By Inter-Intra Relational Reasoning", arXiv:2011.13548v1 [cs.LG] Nov. 27, 2020, pp. 1-19.

Franceschi et al., "Unsupervised Scalable Representation Learning for Multivariate Time Series", arXiv:1901.10738v4 [cs.LG] Jan. 3, 2020, pp. 1-25.

Hataya et al., "Faster AutoAugment: Learning Augmentation Strategies using Backpropagation", arXiv:1911.06987v1 [cs.CV] Nov. 16, 2019, pp. 1-9.

Hendrycks et al., "Gaussian Error Linear Units (GELUS)", arXiv:1606.08415v4 [cs.LG] Jul. 8, 2020, pp. 1-9.

Hjelm et al., "Learning Deep Representations by Mutual Information Estimation and Maximization", arXiv preprint arXiv:1808.06670. Aug. 20, 2018, pp. 1-24.

Hyvärinen et al., "Unsupervised Feature Extraction by Time-Contrastive Learning and Nonlinear ICA", arXiv:1605.06336v1 [stat.ML] May 20, 2016, pp. 1-11.

Jang et al., "Categorical Reparameterization With Gumbel-Softmax", arXiv:1611.01144v5 [stat.ML] Aug. 5, 2017, pp. 1-13.

Kingma et al., "Adam: a Method for Stochastic Optimization", arXiv:1412.6980v9 [cs.LG] Jan. 30, 2017, pp. 1-15.

Lai et al., "Modeling Long- and Short-Term Temporal Patterns with Deep Neural Networks", arXiv:1703.07015v3 [cs.LG] Apr. 18, 2018, pp. 1-11.

Guennec et al., "Data Augmentation for Time Series Classification using Convolutional Neural Networks", https://halshs.archives-ouvertes.fr/halshs-01357973, Aug. 30, 2016, pp. 1-9.

Li et al., "Enhancing the Locality and Breaking the Memory Bottleneck of Transformer on Time Series Forecasting", arXiv:1907.00235v3 [cs.LG] Jan. 3, 2020, pp. 1-14.

Li et al., "DADA: Differentiable Automatic Data Augmentation", arXiv:2003.03780v3 [cs.CV] Jul. 30, 2020, pp. 1-16.

Luo et al., "Parameterized Explainer for Graph Neural Network", arXiv:2011.04573v1 [cs.LG] Nov. 9, 2020, pp. 1-17.

Luo et al., "Unsupervised Document Embedding via Contrastive Augmentation", arXiv:2103.14542v1 [cs.CL] Mar. 26, 2021, pp. 1-13.

Maddison et al., "The Concrete Distribution: a Continuous Relaxation of Discrete Random Variables", arXiv:1611.00712v3 [cs.LG] Mar. 5, 2017, pp. 1-20.

Oord et al., "Representation Learning with Contrastive Predictive Coding", arXiv:1807.03748v2 [cs.LG] Jan. 22, 2019, pp. 1-13.

Oreshkin et al., "N-Beats: Neural Basis Expansion Analysis for Interpretable Time Series Forecasting", arXiv:1905.10437v4 [cs.LG] Feb. 20, 2020, pp. 1-31.

Pedregosa et al., "Scikit-learn: Machine Learning in Python", arXiv:1201.0490v4 [cs.LG] Jun. 5, 2018, pp. 2825-2830.

Poole et al., "On Variational Bounds of Mutual Information", arXiv:1905.06922v1 [cs.LG] May 16, 2019, pp. 1-14.

Salinas et al., "DeepAR: Probabilistic Forecasting with Autoregressive Recurrent Networks", arXiv:1704.04110v3 [cs.AI] Feb. 22, 2019, pp. 1-12.

Tian et al., "What Makes for Good Views for Contrastive Learning?", 34th Conference on Neural Information Processing Systems (NeurIPS 2020), Dec. 2020, pp. 1-13.

Tishby et al., "The information bottleneck method", arXiv:physics/0004057v1 [physics.data-an] Apr. 24, 2000, pp. 1-16.

Tonekaboni et al., "Unsupervised Representation Learning for Time Series With Temporal Neighborhood Coding", arXiv:2106.00750v1 [cs.LG] Jun. 1, 2021, pp. 1-17.

Wen et al., "Time Series Data Augmentation for Deep Learning: A Survey", arXiv preprint arXiv:2002.12478. Feb. 27, 2020, pp. 4653-4660.

Wilk et al., "Learning Invariances using the Marginal Likelihood", 32nd Conference on Neural Information Processing Systems (NeurIPS 2018), Dec. 2018, pp. 1-11.

Xie et al., "Unsupervised Data Augmentation for Consistency Training", arXiv:1904.12848v6 [cs.LG] Nov. 5, 2020, pp. 1-20.

Yang et al., "10 Challenging Problems in Data Mining Research", International Journal of Information Technology & Decision Making. Dec. 2006, pp. 597-604.

Ying et al., "GNNExplainer: Generating Explanations for Graph Neural Networks", arXiv:1903.03894v4 [cs.LG] Nov. 13, 2019, pp. 1-13.

You et al., "Graph Contrastive Learning with Augmentations", arXiv:2010.13902v3 [cs.LG] Apr. 3, 2021, pp. 1-12.

Yue et al., "TS2Vec: Towards Universal Representation of Time Series", arXiv:2106.10466v4 [cs.LG] Feb. 3, 2022, pp. 1-20.

Zerveas et al., "A Transformer-Based Framework for Multivariate Time Series Representation Learning", arXiv:2010.02803v3 [cs.LG] Dec. 8, 2020, pp. 1-20.

Zhou et al., "Informer: Beyond Efficient Transformer for Long Sequence Time-Series Forecasting", arXiv:2012.07436v3 [cs.LG] Mar. 28, 2021, pp. 1-15.

* cited by examiner

400

420

421

422

433

423

422

421

410

600

Label 1

Label 0

Legend denotes samples with label 0 denotes augmented samples for instance 1 (with label 0)

CONTRASTIVE TIME SERIES REPRESENTATION LEARNING VIA META-LEARNING

RELATED APPLICATION INFORMATION

This application claims priority to U.S. Provisional Patent Application No. 63/246,843, filed on Sep. 22, 2021, and U.S. Provisional Patent Application No. 63/237,544, filed on Aug. 27, 2021, incorporated herein by reference in their entireties.

BACKGROUND

Technical Field

The present invention relates to artificial intelligence and more particularly to contrastive time series representation learning via meta-learning.

Description of the Related Art

Various Artificial Intelligence (AI) systems are deployed for time series analysis in diverse applications recently. However, existing time series learning models typically need a lot of data to train a good model with required predictive power. Thus, they are not data efficient and for those applications with low-data resources, existing methods would not be working since model deep learning models are data hungry.

SUMMARY

According to aspects of the present invention, a computer-implemented method for meta-learning is provided. The method includes receiving a training time series and labels corresponding to some of the training time series. The method further includes optimizing time series augmentations of the training time series using a time series augmentation selection process performed by a meta learner to obtain a selected augmentation from a plurality of candidate augmentations. The method also includes training a time series encoder with contrastive loss using the selected augmentation to obtain a learned time series encoder. The method additionally includes learning, by the learned time series encoder, a vector representation of another time series. The method further includes performing, by the learned time series encoder, a downstream task of label classification for at least a portion of the other time series.

According to other aspects of the present invention, a computer program product for meta-learning is provided. The computer program product includes a non-transitory computer readable storage medium having program instructions embodied therewith. The program instructions are executable by a computer to cause the computer to perform a method. The method includes receiving, by a processor device of the computer, a training time series and labels corresponding to some of the training time series. The method further includes optimizing time series augmentations of the training time series using a time series augmentation selection process performed by a meta learner implemented by the processor device to obtain a selected augmentation from a plurality of candidate augmentations. The method also includes training a time series encoder implemented by the processor device with contrastive loss using the selected augmentation to obtain a learned time series encoder. The method additionally includes learning, by the learned time series encoder, a vector representation of another time series. The method further includes performing, by the learned time series encoder, a downstream task of label classification for at least a portion of the other time series.

According to yet other aspects of the present invention, a computer processing system for meta-learning is provided. The computer processing system includes a memory device for storing program code. The computer processing system further includes a processor device operatively coupled to the memory device for running the program code to receive a training time series and labels corresponding to some of the training time series. The processor device further runs the program code to optimize time series augmentations of the training time series using a time series augmentation selection process performed by a meta learner implemented by the processor device to obtain a selected augmentation from a plurality of candidate augmentations. The processor device also runs the program code to train a time series encoder implemented by the processor device with contrastive loss using the selected augmentation to obtain a learned time series encoder. The processor device additionally runs the program code to learn, by the learned time series encoder, a vector representation of another time series. The processor device further runs the program code to perform, by the learned time series encoder, a downstream task of label classification for at least a portion of the other time series.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Embodiments of the present invention are directed to contrastive time series representation learning via meta-learning.

Embodiments of the present invention introduce criteria for good data augmentations based on information theory, and provide a meta-learning framework to adaptively select optimal dataset-specific augmentations based on the proposed criteria. In an embodiment, the meta-learning network and encoder are jointly optimized in an end-to-end manner to avoid sub-optimal solutions.

Figure 1:
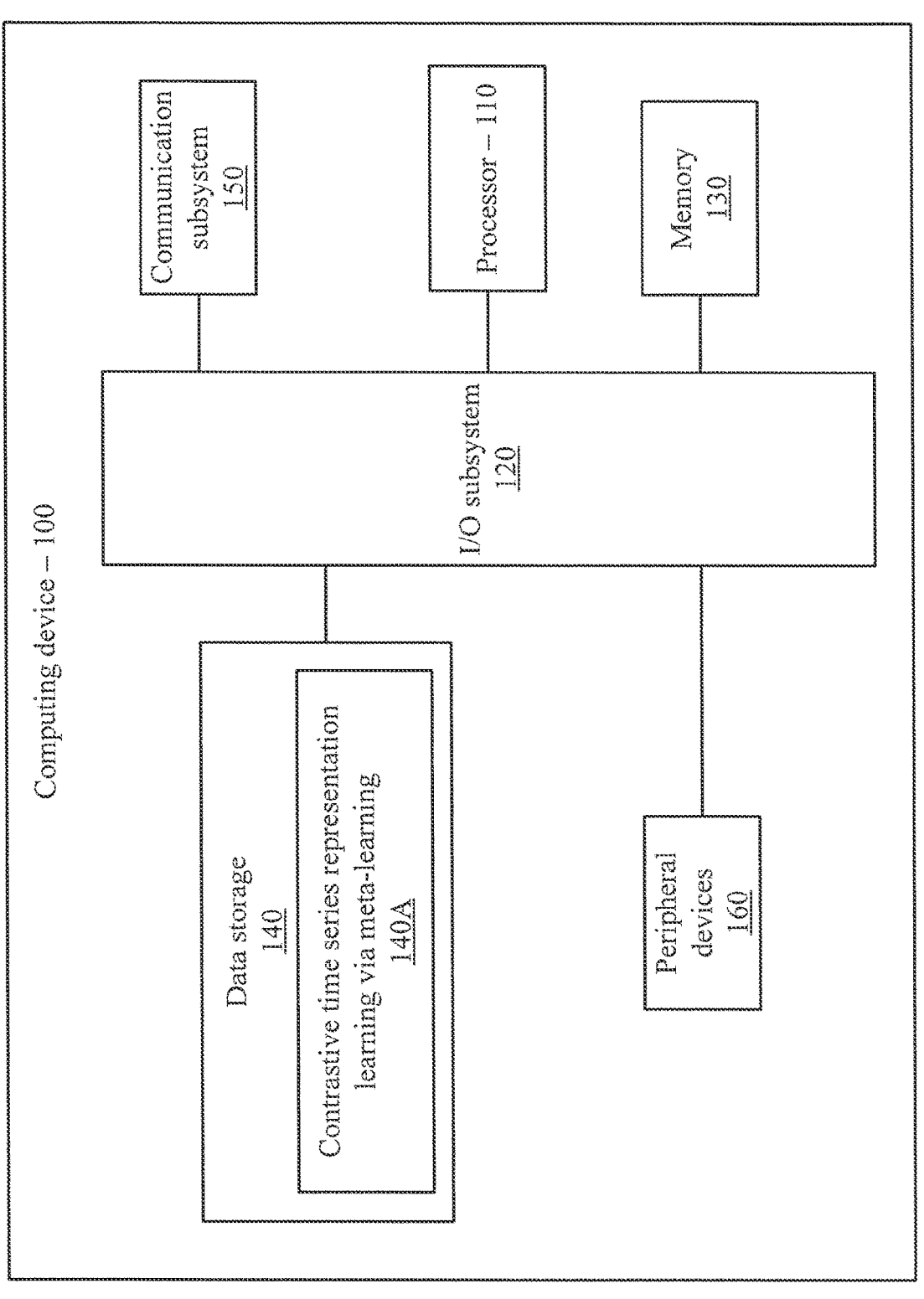
FIG. 1 is a block diagram showing an exemplary computing device, in accordance with an embodiment of the present invention.

FIG. 1 is a block diagram showing an exemplary computing device 100, in accordance with an embodiment of the present invention. The computing device 100 is configured to perform contrastive time series representation learning via meta-learning.

The computing device 100 may be embodied as any type of computation or computer device capable of performing the functions described herein, including, without limitation, a computer, a server, a rack based server, a blade server, a workstation, a desktop computer, a laptop computer, a notebook computer, a tablet computer, a mobile computing device, a wearable computing device, a network appliance, a web appliance, a distributed computing system, a processor- based system, and/or a consumer electronic device. Additionally or alternatively, the computing device 100 may be embodied as a one or more compute sleds, memory sleds, or other racks, sleds, computing chassis, or other components of a physically disaggregated computing device. As shown in FIG. 1, the computing device 100 illustratively includes the processor 110, an input/output subsystem 120, a memory 130, a data storage device 140, and a communication subsystem 150, and/or other components and devices commonly found in a server or similar computing device. Of course, the computing device 100 may include other or additional components, such as those commonly found in a server computer (e.g., various input/output devices), in other embodiments. Additionally, in some embodiments, one or more of the illustrative components may be incorporated in, or otherwise form a portion of, another component. For example, the memory 130, or portions thereof, may be incorporated in the processor 110 in some embodiments.

The processor 110 may be embodied as any type of processor capable of performing the functions described herein. The processor 110 may be embodied as a single processor, multiple processors, a Central Processing Unit(s) (CPU(s)), a Graphics Processing Unit(s) (GPU(s)), a single or multi-core processor(s), a digital signal processor(s), a microcontroller(s), or other processor(s) or processing/controlling circuit(s).

The memory 130 may be embodied as any type of volatile or non-volatile memory or data storage capable of performing the functions described herein. In operation, the memory 130 may store various data and software used during operation of the computing device 100, such as operating systems, applications, programs, libraries, and drivers. The memory 130 is communicatively coupled to the processor 110 via the I/O subsystem 120, which may be embodied as circuitry and/or components to facilitate input/output operations with the processor 110 the memory 130, and other components of the computing device 100. For example, the I/O subsystem

120 may be embodied as, or otherwise include, memory controller hubs, input/output control hubs, platform controller hubs, integrated control circuitry, firmware devices, communication links (e.g., point-to-point links, bus links, wires, cables, light guides, printed circuit board traces, etc.) and/or other components and subsystems to facilitate the input/output operations. In some embodiments, the I/O subsystem 120 may form a portion of a system-on-a-chip (SOC) and be incorporated, along with the processor 110, the memory 130, and other components of the computing device 100, on a single integrated circuit chip.

The data storage device 140 may be embodied as any type of device or devices configured for short-term or long-term storage of data such as, for example, memory devices and circuits, memory cards, hard disk drives, solid state drives, or other data storage devices. The data storage device 140 can store program code for contrastive time series representation learning via meta-learning. The communication subsystem 150 of the computing device 100 may be embodied as any network interface controller or other communication circuit, device, or collection thereof, capable of enabling communications between the computing device 100 and other remote devices over a network. The communication subsystem 150 may be configured to use any one or more communication technology (e.g., wired or wireless communications) and associated protocols (e.g., Ethernet, Infini-Band®, Bluetooth®, WiMAX, etc.) to effect such communication.

As shown, the computing device 100 may also include one or more peripheral devices 160. The peripheral devices 160 may include any number of additional input/output devices, interface devices, and/or other peripheral devices. For example, in some embodiments, the peripheral devices 160 may include a display, touch screen, graphics circuitry, keyboard, mouse, speaker system, microphone, network interface, and/or other input/output devices, interface devices, and/or peripheral devices.

Of course, the computing device 100 may also include other elements (not shown), as readily contemplated by one of skill in the art, as well as omit certain elements. For example, various other input devices and/or output devices can be included in computing device 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized. These and other variations of the processing system 100 are readily contemplated by one of ordinary skill in the art given the teachings of the present invention provided herein.

As employed herein, the term "hardware processor subsystem" or "hardware processor" can refer to a processor, memory (including RAM, cache(s), and so forth), software (including memory management software) or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), FPGAs, and/or PLAs.

These and other variations of a hardware processor subsystem are also contemplated in accordance with embodiments of the present invention A description will now be given regarding notations and problem definition.

A time series instance $x_i$ has dimension T×F, where T is the length of the sequence and F is the dimension of features. Given a set of time series $$\mathbb{X} = \{x_n\}_{n=1}^N$$

of N instances, it is intended to learn an encoder $f(x; \theta)$ that maps each instance to a fixed-length vector $z_i \in \mathbb{R}^D$, where $\theta$ is the learnable parameters of the encoder network and K is the dimension of representation vectors. In semi-supervised setting, each instance $x_i$ in the labelled set $\mathbb{X}_L \subseteq \mathbb{X}$ is associated with a label $y_i$ for downstream tasks. Specifically, $\mathbb{X}_L = \mathbb{X}$ holds in the fully supervised setting.

Figure 2:
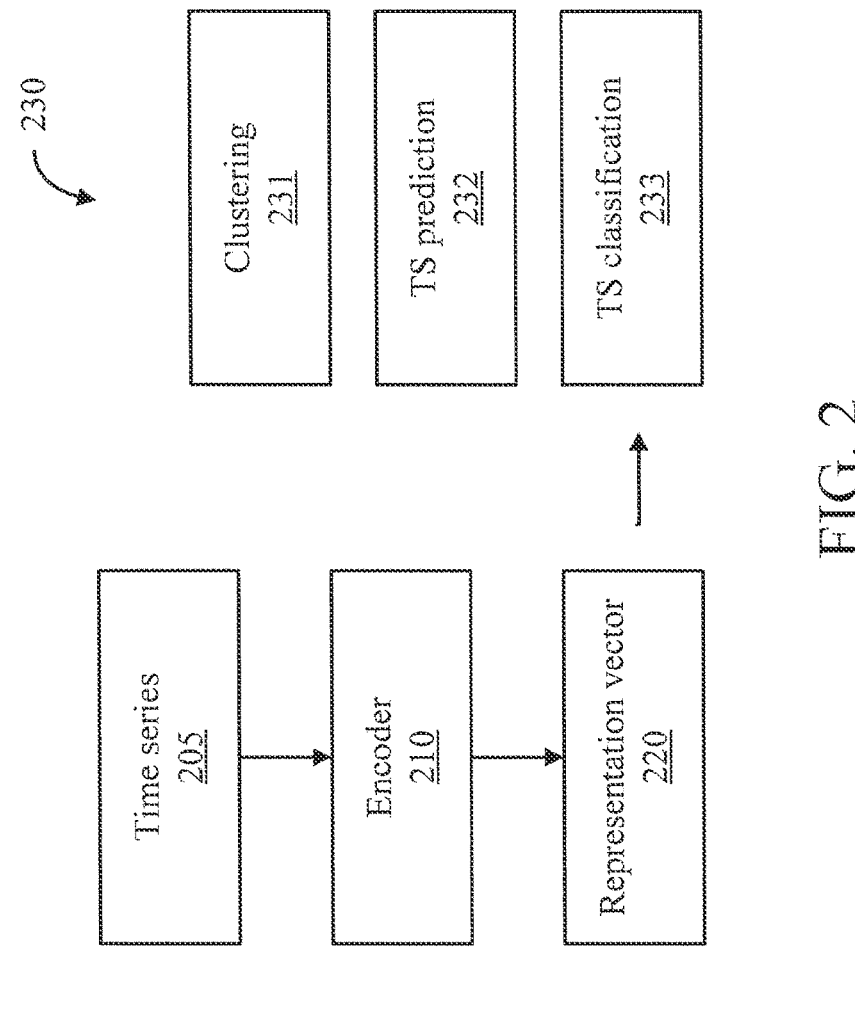
FIG. 2 is a diagram showing time series representation learning and its applications, in accordance with an embodiment of the present invention.

In order to make time series analysis easier, time series representation learning is proposed. FIG. 2 is a diagram showing time series representation learning 200 and its applications, in accordance with an embodiment of the present invention. The task is to encode using an encoder 210 the time series 205 into a compact vector representation 220. Then, the representation 220 is used for downstream tasks 230, such as clustering 231 or supervised classification 232, or even value prediction 233.

Basically, the contrastive learning is to generate augmented views and to contrast the positive and negative pair so that the learning model (typically a deep neural network) is more robust and the resulting representations have better quality.

Figure 3:
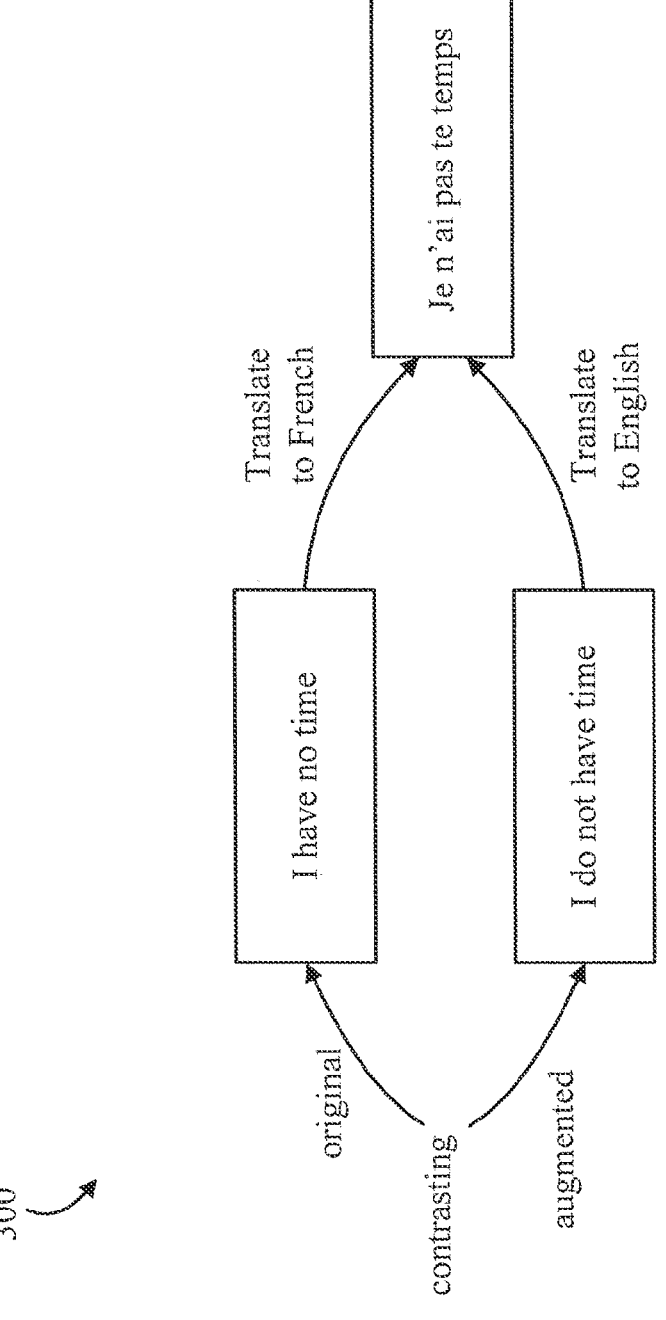
FIG. 3 is a diagram showing a positive contrastive learning example for documents, in accordance with an embodiment of the present invention.

FIG. 3 is a diagram showing a positive contrastive learning example 300 for documents, in accordance with an embodiment of the present invention.

In English, two contrasting terms are "I have no time" (original term) and "I do not have time" (augmentation). The original term is translated to French as "je n' ai pas le temps" and back to the augmentation.

As one can image, for images in regard to contrasting features, certain features will be switched such as a first image with a cat looking right and its tail on the right versus a contrasting second image with the cat looking left and its tail on the left.

The generated augmentations are expressing the same object with the original one (like an image or a sentence). With contrastive learning, the resulting neural network should be invariant to such sample variance, thus obtaining better robustness and embedding performance. Despite the success of applying contrastive learning in images and NLP tasks, it is still challenging to develop a contrastive learning framework for time series representation learning because for time series, it is very hard to generate data augmentations without domain-specific prior knowledge. If the generated time series miss the key signal, then it is wrong to push its embedding as similar as possible as the embedding of the original sample. In accordance with the present invention, we propose an information-aware meta-learning framework to automatically select good augmentations and drop incorrect augmentations for contrastive learning.

Figure 4:
FIG. 4 is a diagram showing an knowledge discovery example of detecting a signal region of time series, in accordance with an embodiment of the present invention.

Embodiments of the present invention propose an information-aware time series contrastive learning framework. The key to the success of the proposed framework is to follow the Information Bottleneck principle to reduce the mutual information between contrastive parts while keeping task-relevant information intact. The key idea of our framework is to use the meta learning framework (outer) to the selection of augmentations of time series and use contrastive learning to conduct representation learning (inner). The bi-level optimization will automatically find the best augmentations and conduct good embedding learning. The selected augmentation will provide a knowledge discovery, for example, automatically find the signal region when selecting the best subsequence 421 from among different subsequences 420 (inclusive of subsequences 421, 422, and 423) as the augmentation of the original subsequence 410 as shown in FIG. 4. FIG. 4 is a diagram showing an knowledge discovery example 400 of detecting a signal region of time series, in accordance with an embodiment of the present invention. Meta augmentation selection criteria is proposed for both supervised and unsupervised cases using information bottleneck (IB) theory.

We propose to address these challenges via Information Bottleneck (IB), which provides a crucial principle for representation learning. Specifically, IB encourages the representations to be maximally informative about the downstream task, which helps keep task-relevant information. Concurrently, IB discourages the representations from acquiring the task-irrelevant information from the input data, which is related to the idea of minimal sufficient statistics. However, different from the typical representation learning, there are two information flows involved in the two augmented views respectively in the contrastive learning. Therefore, a framework for meta augmentation learning, an information-aware contrastive learning framework for time series data is proposed.

To build the optimal graph contrastive learning model for the particular dataset and task, it is noted that it is necessary and sufficient to minimize the mutual information between contrastive representations while maximizing task-relevant information. A good set of views for contrastive learning in the vision domain should share the minimal information necessary to perform well at the downstream task. A good augmentation should be with the following:

(1) High Fidelity: different augmentations should be diverse.

(2) High variety: different augmentations should be diverse.

Thus, to choose best view for contrastive learning, we have the following intuitions:

(1) Views include as much task-relevant information as possible.

(2) The information shared between views is only task-relevant.

Figure 5:
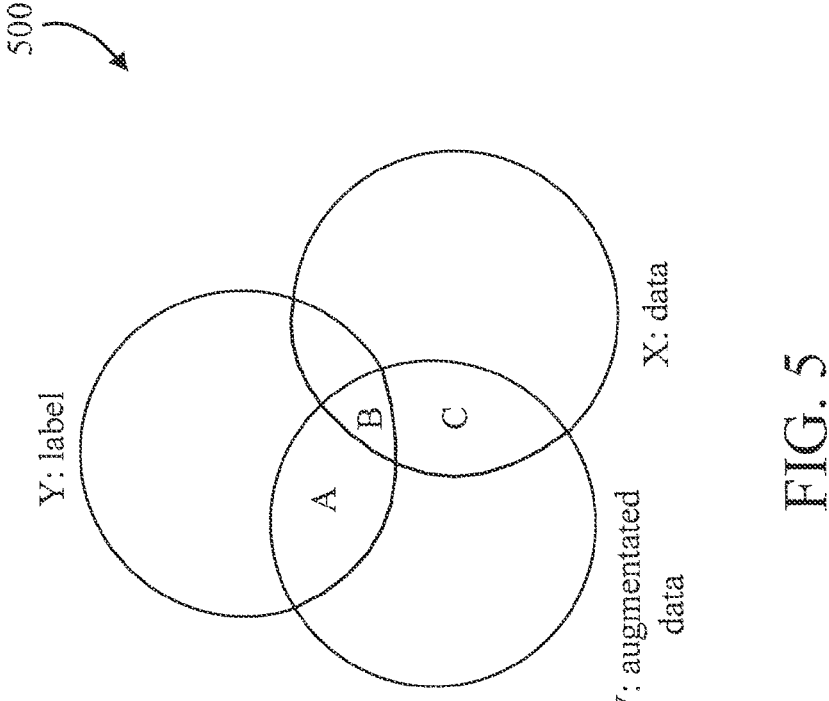
FIG. 5 is a diagram showing a relationship between information of different parts in contrastive learning of time series, in accordance with an embodiment of the present invention.

FIG. 5 is a diagram showing a relationship 500 between information of different parts in contrastive learning of time series, in accordance with an embodiment of the present invention.

In FIG. 5, x denotes training data instances. y denotes the labels of the training data. v denotes the augmented view of the time series data X. A, B, C are the areas of intersection of different parts, respectively. Then, the intuition is to increase I(v; y), i.e., to increase the area size of A+B, at the same time to decrease I(v;x), i.e., to decrease area of B+C. Thus, meta learning is used to select augmentation based Mutual Information with theoretical guarantees.

Maximize MI(V, Y)→High Fidelity (A+B)

Minimize MI(V, X)→High Variety (B+C)

First an encoder is used to learn a representation vector from time series: $f_\theta : x \to z$ Then, the intuition of our objective function is: if v is an augmentation of instance x. For any other instance x':

$$sim(f_\theta(x), f_\theta(v)) \gg sim(f_\theta(x'), f_\theta(v))$$

We use infoNCE loss to model the positive and negative samples as below formula to achieve it as follows:

$$\mathcal{L}_{NCE} = -\mathbb{E}\left[\log \frac{\exp(h(v_{i,n}, v_{j,n}))}{\sum_{h'=1, n' \neq n}^{N} \exp(h(v_{i,n}, v_{j,n'}))}\right] \quad (1)$$

where h(·) is a contrasting operation to scores the agreement between two representations. Theoretically, minimizing the InfoNCE loss equivalently maximizes a lower bound on the mutual information between the views of positive pairs. In other words, $I(v_i, v_j) \geq \log(N) - \mathcal{L}_{NCE}$, wherein I(·) measures the mutual information.

We use meta-learning to automatically select augmentations, i.e., selector: $g_\lambda : \{v_1, v_2, \ldots v_k\} \to v$. Our objective for the supervised learning case is: maximize variety and fidelity as follows:

$$\min_{v} MI(v, x) - \beta MI(v, y) \quad (2)$$

For unsupervised learning case, we use the following objective:

$$\min_{v} MI(v, x) \text{ s.t. } sup_{x' \neq x} MI(v, x') \leq MI(v, x) \quad (3)$$

Figure 6:
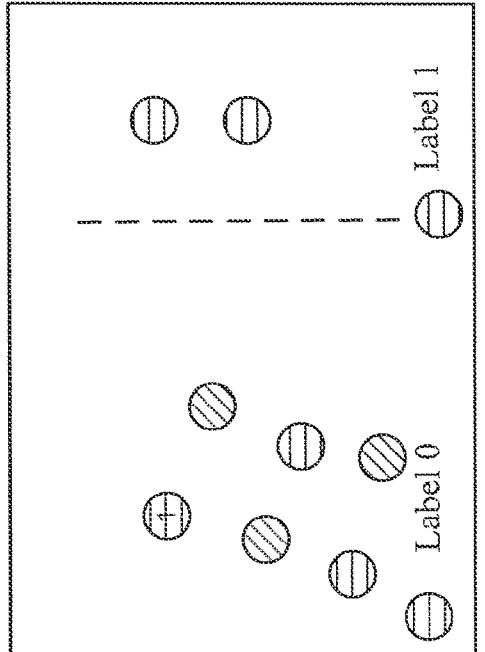
FIG. 6 is a diagram showing an intuition of criteria for selection of good augmentations of time series in a supervised setting, in accordance with an embodiment of the present invention.
Figure 7:
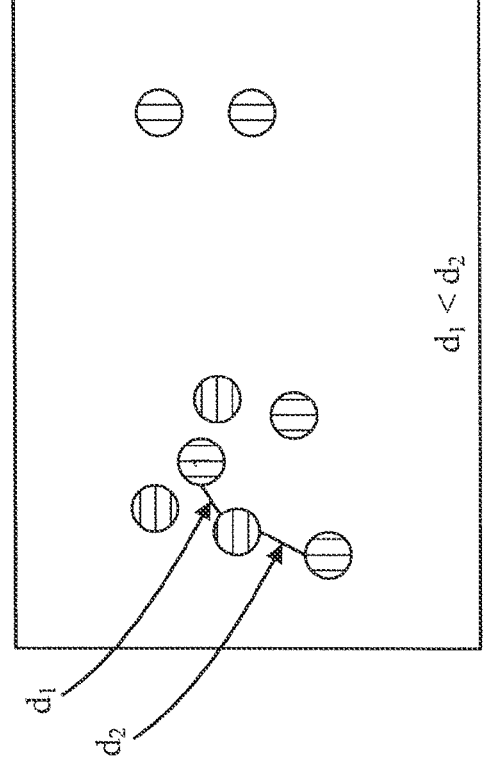
FIG. 7 is a diagram showing an intuition of criteria for selection of good augmentations of time series in an unsupervised setting, in accordance with an embodiment of the present invention.
Figure 7:
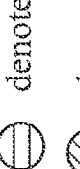
Figure 7:

FIG. 6 is a diagram showing an intuition 600 of criteria for selection of good augmentations of time series in a supervised setting, in accordance with an embodiment of the present invention. FIG. 7 is a diagram showing an intuition 700 of criteria for selection of good augmentations of time series in an unsupervised setting, in accordance with an embodiment of the present invention. If y is known, then the augmented instances should keep the label information. Otherwise, the distances between them and instance 1 should be smaller than the others.

With the meta augmentation selection criteria, we can conduct meta-learning in the following steps.

(1) Auto-Augmentations by Meta-Learning.

Apply different augmentations on each instance x, get augmented instances $x^{(i)}, x^{(2)} \ldots x^{(k)}$ Each augmentation method is with a weight $\lambda_1, \lambda_2 \ldots \lambda_k$. The augmented instance v for x is as follows:

$$\epsilon_i, \epsilon_2 \ldots \epsilon_k \sim \text{Uniform}(0, 1) \quad (4)$$

$$w_i = \frac{\exp\left(\frac{\log(\lambda_i) + \epsilon_i}{\tau}\right)}{\sum_{j=1}^{k} \exp\left(\frac{\log(\lambda_j) + \epsilon_j}{\tau}\right)}$$

$$v = \sum_i w_i x^i$$

(2) Adopt Equation (1) as the Contrastive Learning Framework Loss.

The parameters of the encoder and the meta-parameters for generating augmented data are alternatively updated in the optimization until convergence.

Figure 8:
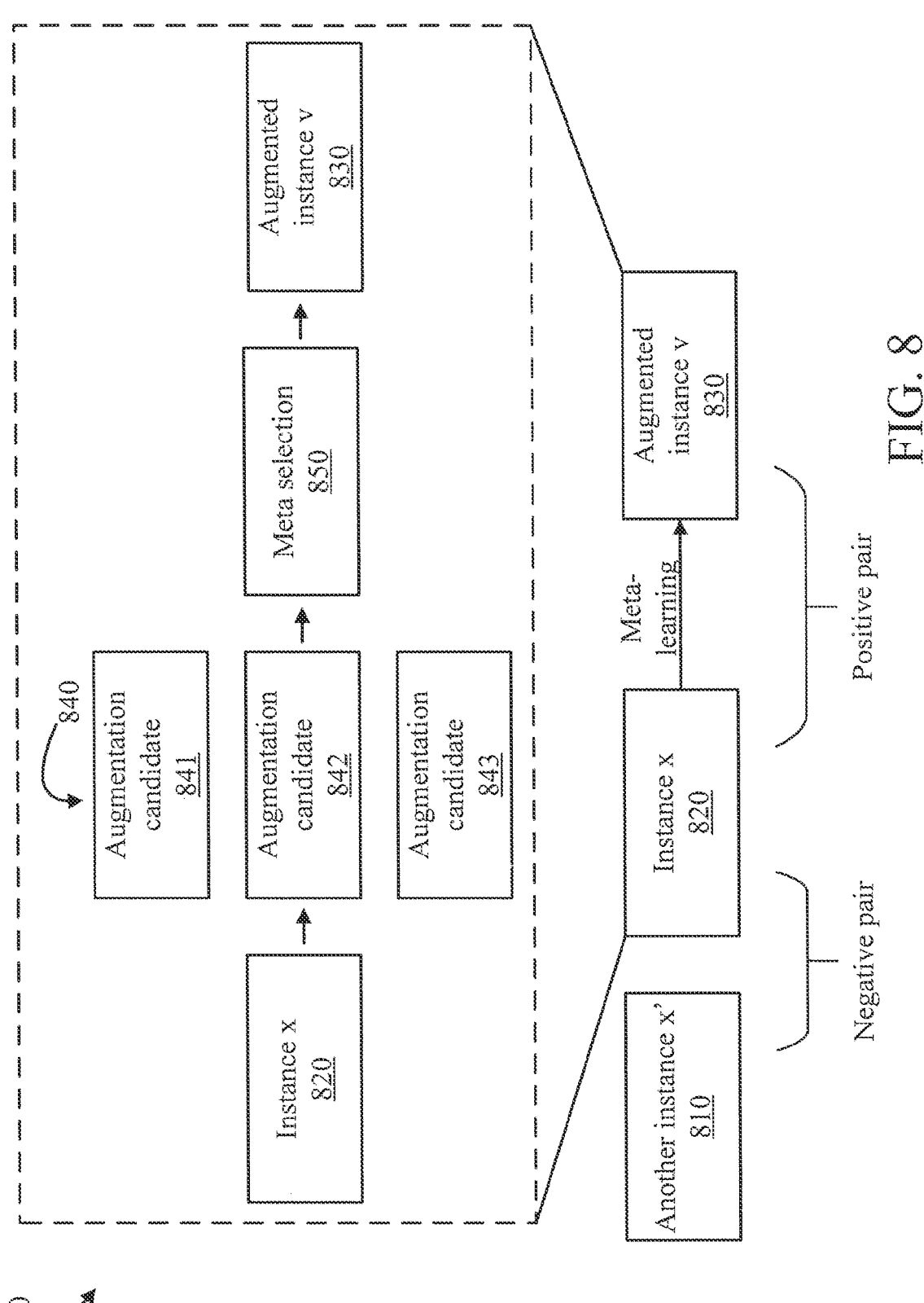
FIG. 8 is a diagram showing a pipeline of a framework for a supervised learning task, in accordance with an embodiment of the present invention.

FIG. 8 is a diagram showing a pipeline 800 of a framework for a supervised learning task, in accordance with an embodiment of the present invention.

When instance x is received as the input, the system will first generate a set of candidate data augmentations. Then meta selection module will select a subset of candidate augmentations based upon the information theory based criteria. The selected instances will be used to learning the embedding of the given time series x using contrastive learning framework.

$$\text{Contrastive objective:} \min_{\theta} -\log \frac{ecp(sim(f_\theta(x), f_\theta(v)))}{\sum_{k'} \exp(sim(f_\theta(x'), f_\theta(v)))}$$

$$\text{Meta objective } \min_{\lambda} MI(v, x) - \beta MI(v, y)$$

A description will now be given regarding what are good augmentations for contrastive learning.

The goal of data augmentation for contrastive learning is to create realistically rational instances that maintain semantics through difference transformation approaches. Unlike instances in vision and language domains, the underlying semantics of time series data is not recognizable to humans, making it almost impossible to include human knowledge to data augmentation for time series data. For example, rotating an image will not change its content or the label. While permuting a time series instance may ruin its signal patterns and generates a meaningless time series instance. In addition, the tremendous heterogeneity of real-life time series datasets further makes selections based on trial-and-error impractical. Although multiple data augmentation methods have been proposed for time series data, there is less discussion on what is a good augmentation without any human prior knowledge. From our perspective, ideal data augmentations for contrastive representation should keep high fidelity, high variety and adaptive to different datasets.

High fidelity. Augmentations with high fidelity maintain the semantic identity that is invariant to transformations in the original instance. Considering the inexplicability in practical time series data, it is challenging to visually check the fidelity of augmentations. Thus, we assume that the semantic identity of a time series instance is presented by its label in the downstream task. Based on the information theory, we define an objective that keeps high fidelity as the mutual information (MI) between augmented instance v and its label y.

$$\max_{v} MI(v; y) \quad (1)$$

We consider augmentation v as a probabilistic function of x with a random variable $\epsilon$, that $v=g(x; \epsilon)$. From the definition of mutual information, we have $MI(v; y)=H(y)-H(y|v)$. Since $H(y)$ is irrelevant to data augmentations, the objective is equivalent to minimizing the conditional entropy $H(y|v)$. With $v=g(x;\epsilon)$, we have $H(y|v)=\mathbb{E}_\epsilon[H(y|g(x;\epsilon))]$. Considering the efficient optimization, we approximate it with cross entropy between y and $\hat{y}$, where $\hat{y}$ is the prediction with augmentation v as the input and calculated via $$v = g(x; \epsilon) \quad z = f(v; \theta) \quad \hat{y} = p(z; w) \tag{2}$$

where z is the representation and $p(; w)$ is a prediction projector parameterized by w. With Monte Carlo, we approximate $\max_v MI(v; y)$ with $$\min_v -\frac{1}{k}\sum_{k=1}^K \sum_{c=1}^C P(y = c)\log P(\hat{y} = c) \tag{3}$$

where K is the total number of sampled augmentations and C is the number of labels.

In the unsupervised settings where y is unavailable, one-hot encoding is utilized as the pseudo label. Since the number of labels equals to the number of instances in dataset $\mathbb{X}$, direct optimization of Equation (3) is inefficient and unsalable. Thus, it is further relaxed by approximating y with the batch-wise one-hot encoding $y_B$, which decreases the number of labels C from the dataset size to the batch size.

High Variety. Sufficient variances in the augmented instances improves the generalization capacity of contrastive learning models. Similar to Equation (1), high variety of augmentation v can be achieved by minimizing the mutual information between v and x.

$$\min_v MI(v; x) \tag{4}$$

Considering the continuity of both v and x, we adopt a mutual information neural estimation method as the approximation, which has been provided as its low bound. The objective can be expressed as follows:

$$\min_v -\sum_{x' \in \mathbb{X}_B} \log\frac{\exp(sim(z_v, z_x))}{\exp(sim(z_v, z_{x'}))} + \log\frac{\exp(sim(z_v, z_x))}{\sum_{x' \in \mathbb{X}_B}\exp(sim(z_{v'}, z_x))} \tag{5}$$

where $\mathbb{X}_B$ is a batch of input time series and v' is an augmentation of input x'. $sim(u, v)=u^Tv/\|u\|\|v\|$ is the dot product of normalized vectors u and v.

Criteria. The combination of high fidelity and variety requirements leads to the criteria for selecting good augmentations without prior knowledge $$\min_v MI(v; x) - \beta MI(v; y) \tag{6}$$

where β is a hyper-parameter to achieve eh trade-off between fidelity and variety.

Relation to Information Bottleneck. Although the formation is similar to the information bottleneck in data compression, $$\min_{p(t|x)} MI(x; t) - \beta MI(t; y),$$

our criteria is different in the following aspects. First, t in information bottleneck is a representation of input x, while v in Equation (6) represents the augmentations. Second, information bottleneck aims to keep minimal and sufficient information for data compression, while our criteria is designed for data augmentations in contrastive learning. Third, in information bottlenecks, the compressed representation t is a deterministic function of input instance x with no variances. $MI(t; y)$ and $MI(t; x)$ are constrained by $MI(t; y)$ and $H(X)$ that $MI(t; y)\leq MI(x; y)$ and $MI(t; x)=H(t)$, where $H(t)$ is the entropy of t. In our criteria, v is a probabilistic function of input x. As a result, the variances of v makes the augmentation space much larger than the compression representation space in information bottlenecks.

Relation to InfoMin. InfoMin is designed based on the information bottleneck that good views should keep minimal and sufficient information from the original input. Similar to information bottleneck, InfoMin assumes that augmented views are functions of input instances, which heavily constrains the variance of data augmentations. Besides, high fidelity property is dismissed in the unsupervised setting. It works well for image datasets due to the available human knowledge. However, it may fail to generate reasonable augmentation for time series data.

A description will now be given regarding contrastive time series representation learning via meta learning, in accordance with an embodiment of the present invention.

It is intended to design a learnable augmentation generator that learns to generate the augmented time series in a data-driven manner. With such adaptive data augmentations, contrastive loss is then used to train the encoder that learns representations from raw time series.

The adopted encoder $f(x; \theta): \mathbb{R}^{T \times F} \to \mathbb{R}^D$ includes two components, a fully connected layer and a 10-layer dilated CNN module. To explore the inherent structure of time series, we include both global-wise (instance-level) and local-wise (subsequence-level) losses in the contrastive learning framework to train the encoder.

Global-wise contrastive loss is designed to capture the instance level relations in a time series dataset. Formally, given a batch of time series instances $\mathbb{X}_B \subseteq \mathbb{X}$, for each instance $x_i \in \mathbb{X}_b$, we adaptively generate an augmented instance $v_i$ introduced later.

For each input instance $x_i$, the raw input and its corresponding augmentation $(v_i, x_i)$ is regarded as a positive pair and other $2(B-1)$ combinations, $\{(v_i, x_j)\}_{i\neq j}+\{(v_i,x_i)\}_{i\neq j}$ are considered negative pairs. The global-wise contrastive loss is based on InfoNCE as follows:

$$L_g = -\sum_{x \in X_B} \log\frac{\exp(sim(z_v, z_x))}{\exp(sim(z_v, z_{x'}))} + \log\frac{\exp(sim(z_v, z_x))}{\exp(sim(z_{v'}, z_x))} \tag{7}$$

where v' is the augmentation of x' and $sim(u, v)$ is the similarity function of vectors u and v.

Local-wise contrastive loss is proposed to explore the intra-temporal relations in time series. For an augmentation v of a time series instance x, we first split it into a set of subsequences V, with length L. For each subsequence $i \in V$, a positive pair (i, p) is generated by selecting another subsequence close to it. Non-neighboring samples are adopted as the negative pairs $\overline{N}_i$. Similar to Equation (7), the local-wise contrastive loss for an instance x is as follows:

$$L_{C_x} = -\sum_{i \in V} \log \frac{\exp(sim(z_i, z_p))}{\exp\left(sim(z_i, z_p) + \sum_{j \in \overline{N}_i} \exp(sim(z_i, z_j))\right)} \qquad (8)$$

Across all instances in a mini-batch, we have $L_c = \sum_{x \in X_B} L_{C_x}$.

Then, the final contrastive objective is as follows:

$$\min_{\theta} L_g + \alpha L_c \qquad (9)$$

where $\propto$ is a hyperparameter to achieve the trade-off between global and local contrastive losses.

A description will now be given regarding a meta-learner network, in accordance with an embodiment of the present invention.

Given criteria of good augmentations, it is described how to adaptively select the optimal augmentations with a meta-learner network. A set of candidate transformations T such as jitter and time warping is selected. Each candidate transformation $t_i \in T$ is associated with an important weight $p_i \in [0,1]$, inferring the probability of selecting transformation $t_i$. For an instance x, the augmented instance $v_i$ through transformation $t_i$ can be computed by the following:

$$a \sim \text{Bernoulli}(p_i) \quad v_i = (1-a)x + at_i(x) \qquad (10)$$

Considering multiple transformations, all $v_i$ are padded to be the same length. Then the adaptive augmented instance can be achieved by combining candidate ones, $$v = \frac{1}{|T|} \sum v_i. $$

To enable the efficient optimization with gradient-based methods, discrete Bernoulli processes are approximated with binary concrete distributions. Specifically, a in Equation (10) is replaced with the following:

$$\epsilon \sim \text{Uniform}(0, 1) \quad \propto \; = \sigma\left(\left(\log\epsilon - \log(1 - \epsilon) + \log\frac{p_i}{1 - p_i}\right)/\tau\right) \qquad (11)$$

where $\sigma(\cdot)$ is the sigmoid function and $\tau$ is the temperature controlling the approximation.

Figure 9:
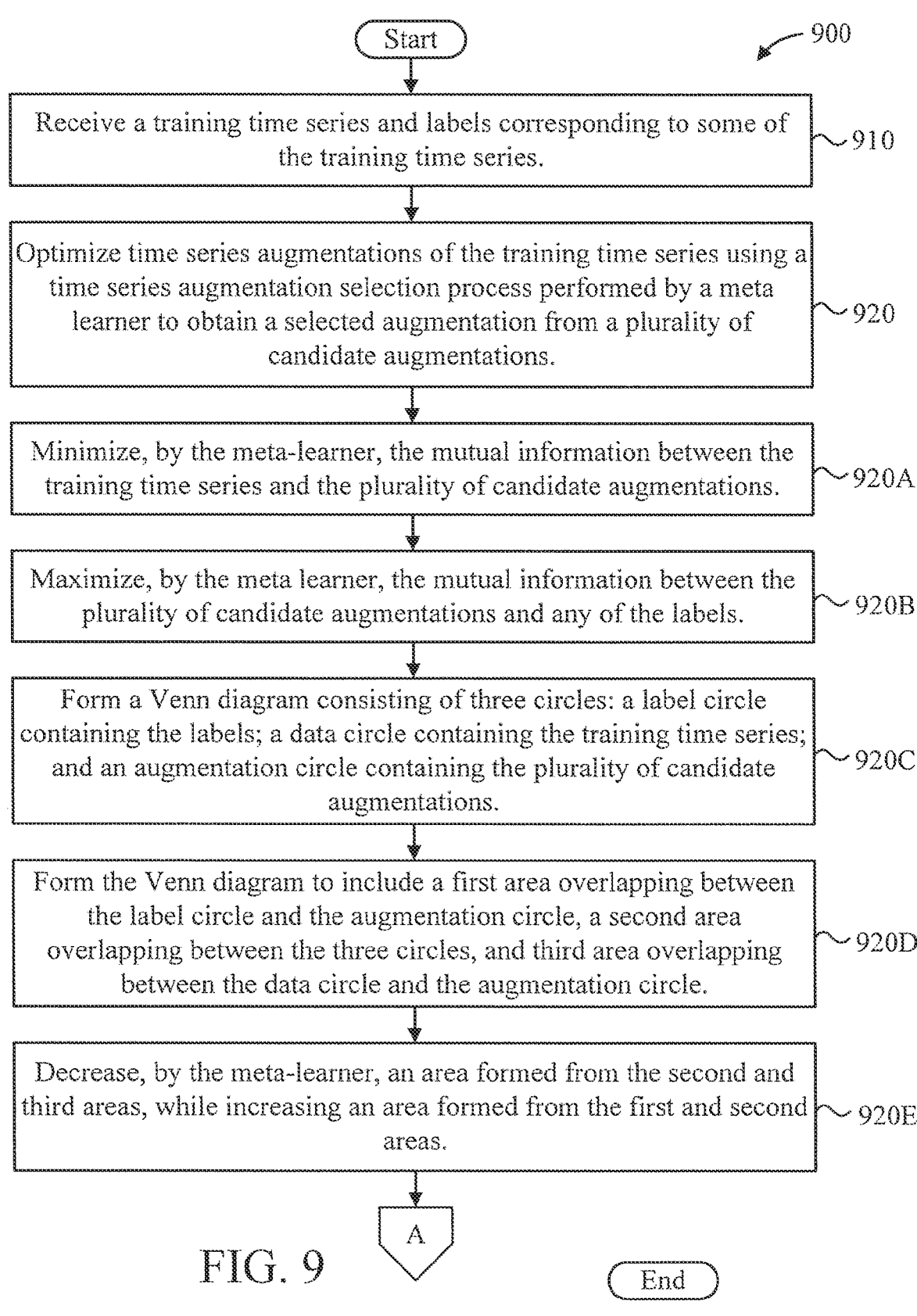
FIGS. 9-10 show an exemplary method for contrastive time series representation learning via meta-learning, in accordance with an embodiment of the present invention.
Figure 10:
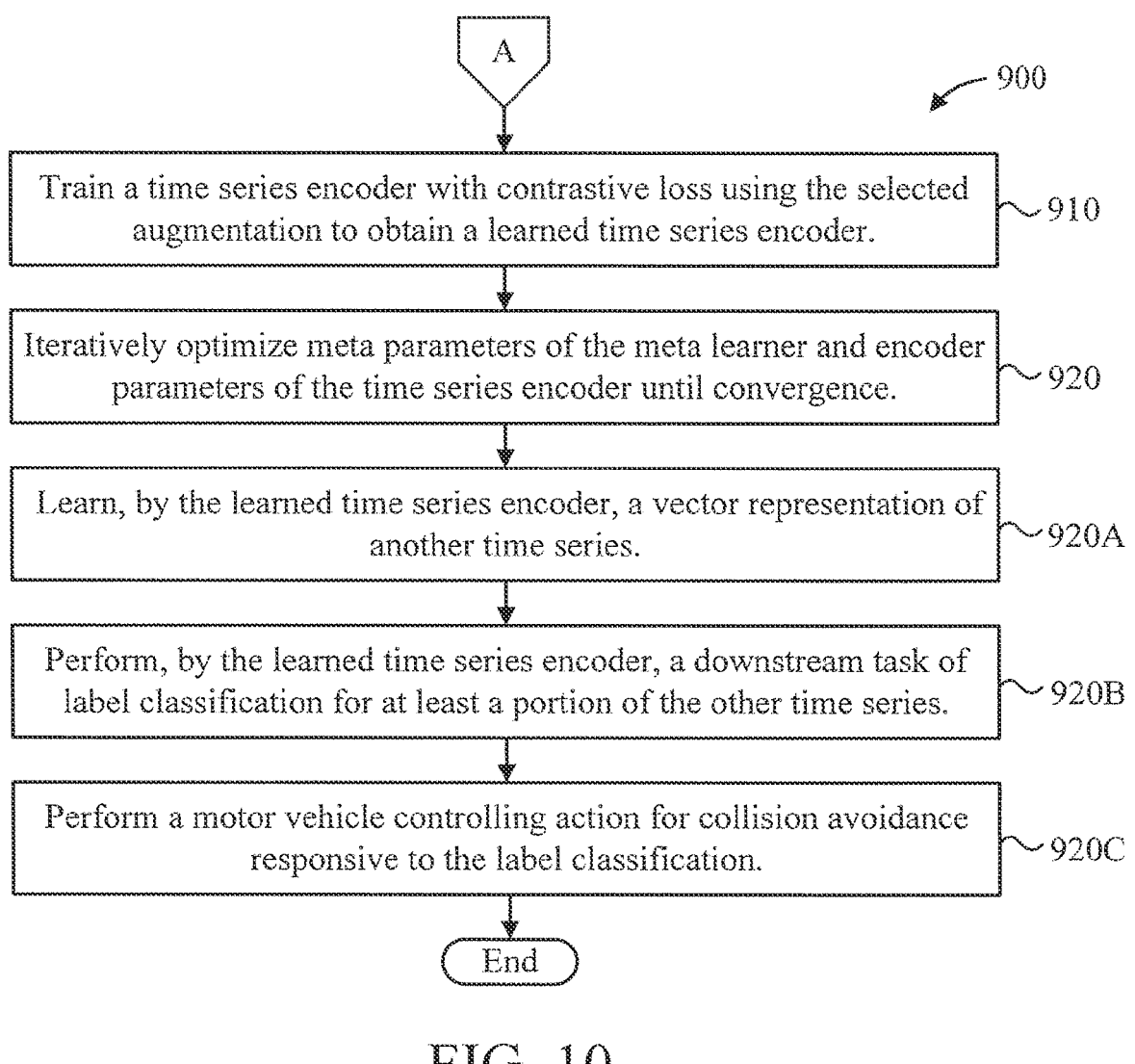

FIGS. 9-10 show an exemplary method 900 for contrastive time series representation learning via meta-learning, in accordance with an embodiment of the present invention.

At block 910, receive a training time series and labels corresponding to some of the training time series.

At block 920, optimize time series augmentations of the training time series using a time series augmentation selection process performed by a meta learner to obtain a selected augmentation from a plurality of candidate augmentations.

In an embodiment, block 920 can include one or more of blocks 920A through 920E.

At block 920A, minimize, by the meta-learner, the mutual information between the training time series and the plurality of candidate augmentations.

At block 920B, maximize, by the meta learner, the mutual information between the plurality of candidate augmentations and any of the labels.

At block 920C, form a Venn diagram consisting of three circles: a label circle containing the labels; a data circle containing the training time series; and an augmentation circle containing the plurality of candidate augmentations.

At block 920D, form the Venn diagram to include a first area overlapping between the label circle and the augmentation circle, a second area overlapping between the three circles, and third area overlapping between the data circle and the augmentation circle.

At block 920E, decrease, by the meta-learner, an area formed from the second and third areas, while increasing an area formed from the first and second areas.

At block 930, train a time series encoder with contrastive loss using the selected augmentation to obtain a learned time series encoder.

In an embodiment, block 930 can include one or more of blocks 930A and 930B.

At block 930A, for each of a plurality of time series learning tasks, generate different augmentations for different time series samples.

At block 930B, iteratively optimize meta parameters of the meta learner and encoder parameters of the time series encoder until convergence.

At block 940, learn, by the learned time series encoder, a vector representation of another time series.

At block 950, perform, by the learned time series encoder, a downstream task of label classification for at least a portion of the other time series. In an embodiment, block 950 can involve performing other downstream tasks such as, but not limited to, time series classification, time series retrieval, time series clustering, time series anomaly detection, time series prediction, etc.

At block 960, perform a motor vehicle controlling action for collision avoidance responsive to the label classification. The motor vehicle controlling action can be performed by an Advanced Driver Assistance System (ADAS), and can involve controlling the steering, accelerating, and/or braking of the vehicle for collision avoidance.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A computer-implemented method for meta-learning, comprising:

receiving a training time series and labels corresponding to some of the training time series;

optimizing time series augmentations of the training time series using a time series augmentation selection process performed by a meta learner to obtain a selected augmentation from a plurality of candidate augmentations that maximize task-relevant information from the training time series and minimize mutual information between contrastive representations;

training a time series encoder with contrastive loss using the selected augmentation to obtain a learned time series encoder;

learning, by the learned time series encoder, a vector representation of another time series obtained from a traffic scene that includes an autonomous vehicle; and performing, by the learned time series encoder, a downstream task of label classification for at least a portion of the other time series to control the autonomous vehicle to avoid collisions responsive to the label classification of objects from the traffic scene.

2. The computer-implemented method of claim 1, wherein said training step comprises, for each of a plurality of time series learning tasks, generating different augmentations for different time series samples in the training time series.

3. The computer-implemented method of claim 2, wherein said training step iteratively optimizes meta parameters of the meta learner and encoder parameters of the time series encoder until convergence.

4. The computer-implemented method of claim 1, wherein the meta-learner minimizes the mutual information between the training time series and the plurality of candidate augmentations.

5. The computer-implemented method of claim 4, wherein the meta learner maximizes the mutual information between the plurality of candidate augmentations and any of the labels.

6. The computer-implemented method of claim 1, wherein the meta learner forms a Venn diagram consisting of three circles: a label circle containing the labels; a data circle containing the training time series; and an augmentation circle containing the plurality of candidate augmentations.

7. The computer-implemented method of claim 6, wherein the Venn diagram comprises a first area overlapping between the label circle and the augmentation circle, a second area overlapping between the three circles, and third area overlapping between the data circle and the augmentation circle.

8. The computer-implemented method of claim 7, wherein the meta learner decreases an area formed from a combination of the second and third areas, while increasing an area formed from a combination of the first and second areas.

9. The computer-implemented method of claim 1, further comprising performing a motor vehicle controlling action for collision avoidance responsive to the label classification.

10. The computer-implemented method of claim 1, wherein said training step comprises determining a global-wise contrastive loss designed to capture instance level relations in the training time series and a local-wise contrastive loss designed to explore the intra-temporal relations in the training time series.

11. A computer program product for meta-learning, the computer program product comprising a non-transitory computer readable storage medium having program instructions embodied therewith, the program instructions executable by a computer to cause the computer to perform a method comprising:

receiving, by a processor device of the computer, a training time series and labels corresponding to some of the training time series;

optimizing time series augmentations of the training time series using a time series augmentation selection process performed by a meta learner implemented by the processor device to obtain a selected augmentation from a plurality of candidate augmentations that maximize task-relevant information from the training time series and minimize mutual information between contrastive representations;

training a time series encoder implemented by the processor device with contrastive loss using the selected augmentation to obtain a learned time series encoder;

learning, by the learned time series encoder, a vector representation of another time series obtained from a traffic scene that includes an autonomous vehicle; and performing, by the learned time series encoder, a downstream task of label classification for at least a portion of the other time series to control the autonomous vehicle to avoid collisions responsive to the label classification of objects from the traffic scene.

12. The computer program product of claim 11, wherein said training step comprises, for each of a plurality of time series learning tasks, generating different augmentations for different time series samples in the training time series.

13. The computer program product of claim 12, wherein said training step iteratively optimizes meta parameters of the meta learner and encoder parameters of the time series encoder until convergence.

14. The computer program product of claim 11, wherein the meta-learner minimizes the mutual information between the training time series and the plurality of candidate augmentations.

15. The computer program product of claim 14, wherein the meta learner maximizes the mutual information between the plurality of candidate augmentations and any of the labels.

16. The computer program product of claim 11, wherein the meta learner forms a Venn diagram consisting of three circles: a label circle containing the labels; a data circle containing the training time series; and an augmentation circle containing the plurality of candidate augmentations.

17. The computer program product of claim 16, wherein the Venn diagram comprises a first area overlapping between the label circle and the augmentation circle, a second area overlapping between the three circles, and third area overlapping between the data circle and the augmentation circle.

18. The computer program product of claim 17, wherein the meta learner decreases an area formed from a combination of the second and third areas, while increasing an area formed from a combination of the first and second areas.

19. The computer program product of claim 11, further comprising performing a motor vehicle controlling action for collision avoidance responsive to the label classification.

20. A computer processing system for meta-learning, comprising:

a memory device for storing program code;

a processor device operatively coupled to the memory device for running the program code to receive a training time series and labels corresponding to some of the training time series;

optimize time series augmentations of the training time series using a time series augmentation selection process performed by a meta learner implemented by the processor device to obtain a selected augmentation from a plurality of candidate augmentations that maximize task-relevant information from the training time series and minimize mutual information between contrastive representations;

train a time series encoder Implemented by the processor device with contrastive loss using the selected augmentation to obtain a learned time series encoder;

learn, by the learned time series encoder, a vector representation of another time series obtained from a traffic scene that includes an autonomous vehicle; and perform, by the learned time series encoder, a downstream task of label classification for at least a portion of the other time series to control the autonomous vehicle to avoid collisions responsive to the label classification of objects from the traffic scene.

* * * * *